(12) United States Patent
Nava

(10) Patent No.: US 10,633,197 B2
(45) Date of Patent: Apr. 28, 2020

(54) HANDLING DEVICE FOR CONTAINERS PROVIDED WITH CLAMPS FOR OPENING ON COMMAND

(71) Applicant: SMI S.P.A. CON SOCIO UNICO, Bergamo (IT)

(72) Inventor: Angelo Nava, Bergamo (IT)

(73) Assignee: SMI S.P.A. CON SOCIO UNICO, Bergamo (IT)

( * ) Notice: Subject to any disclaimer, the term of this patent is extended or adjusted under 35 U.S.C. 154(b) by 0 days.

(21) Appl. No.: 16/293,420

(22) Filed: Mar. 5, 2019

(65) Prior Publication Data

US 2019/0276175 A1    Sep. 12, 2019

(30) Foreign Application Priority Data

Mar. 6, 2018   (IT) .................. 102018000003295

(51) Int. Cl.
*B65G 47/86*      (2006.01)
*B25J 15/00*      (2006.01)
(Continued)

(52) U.S. Cl.
CPC ........ *B65G 47/847* (2013.01); *B25J 15/0226* (2013.01); *B65B 43/46* (2013.01); *B65G 2201/0247* (2013.01)

(58) Field of Classification Search
CPC .......... B65G 47/847; B65G 2201/0247; B65B 43/46; B25J 15/0226; B08B 9/426; B67C 3/242
(Continued)

(56) References Cited

U.S. PATENT DOCUMENTS 6,079,541 A * 6/2000 Bercelli ................. B08B 9/426
                                              198/377.03
6,959,953 B2 * 11/2005 Graffin .................... B67B 3/206
                                              198/470.1
(Continued)

FOREIGN PATENT DOCUMENTS

CN   202241947 U   5/2012
DE   296 07 868 U1  7/1997
(Continued)

OTHER PUBLICATIONS

Italian Search Report for corresponding Italian Patent Application No. 102018000003295 dated Nov. 16, 2018, 8 pages.

*Primary Examiner* — Dean J Kramer
(74) *Attorney, Agent, or Firm* — Merchant & Gould P.C.

(57) ABSTRACT

A handling device includes a support element, a support plate fixed to the support element, a drive shaft, a rotation plate hinged to the drive shaft and an elastic return element. Clamps connect to the rotation plate and include first and second jaws, each having a handling portion and a drive portion. A conduction wheel connects to the drive portion of the first jaw. The second jaw drive portion has a slot with a pressure surface. The second jaw drive portion connects to the first jaw drive portion. A cam profile at a peripheral area of the support plate provides for opening. The first jaw opens when the conduction wheel rotates on the cam profile. A wheel mounts onto the first jaw drive portion inserts inside the slot. The second jaw opening couples to the first jaw opening by the wheel, which acts on the pressure surface.

9 Claims, 5 Drawing Sheets

(51) Int. Cl.
*B25J 15/02* (2006.01)
*B65B 43/46* (2006.01)

(58) Field of Classification Search
USPC .................. 294/116; 198/803.07, 803.09
See application file for complete search history.

(56) References Cited

U.S. PATENT DOCUMENTS

| | | | | |
|---|---|---|---|---|
| 8,191,948 | B2 * | 6/2012 | Preti | B65G 47/847 |
| | | | | 294/106 |
| 8,439,413 | B2 * | 5/2013 | Cirio | B67C 3/242 |
| | | | | 198/803.7 |
| 9,022,442 | B2 * | 5/2015 | Rousseau | B29C 49/4205 |
| | | | | 294/106 |

FOREIGN PATENT DOCUMENTS

| | | |
|---|---|---|
| DE | 20 2008 014 089 U1 | 1/2009 |
| EP | 1 186 759 A1 | 5/2010 |
| EP | 2 703 322 A1 | 3/2014 |

* cited by examiner

HANDLING DEVICE FOR CONTAINERS PROVIDED WITH CLAMPS FOR OPENING ON COMMAND

BACKGROUND OF THE INVENTION

This application claims benefit of Ser. No. 102018000003295, filed 6 Mar. 2018 in Italy and which application is incorporated herein by reference. To the extent appropriate, a claim of priority is made to the above disclosed application.

The present invention relates to a handling device for containers provided with clamps for opening on command.

The automation of industrial packaging processes such as for example, stretch-molding, capping or labeling bottles made of thermoplastic material, occurs by work stations, for example carousels, which operate in series. The carousels are rotating work stations on which the various sub-operations adapted to generate the end product are carried out on the semi-finished product.

The transfer of the semi-finished product from one work station to the next, for example from one carousel to the next, occurs by transport systems, e.g. distribution stars. The distribution stars are also rotating machines which rotate in synchrony with the carousel to which they are coupled.

In general, the distribution stars are provided with a plurality of handling devices including clamps, which grip the container from one carousel or from another distribution star and, while rotating, transfer it to a successive distribution star or to a carousel on which the successive production process takes place.

The clamps, arranged on the periphery of the handling device, extend away from the handling device, sliding on a cam profile so as to approach the container to be gripped or the operating unit to which the container is to be released. When the clamp is close to the gripping or release point, the clamp jaws open to receive or release the container, to then close again.

The handling devices of the known art are provided with clamps which generally are divided in two categories: clamps for no command opening (or passive clamps) and clamps for opening on command (or active clamps).

The jaws in clamps for not opening on command are kept in closed position by an elastic means and are opened by the interference between the profile of the jaws and the profile of the container to be gripped. The contact and the sliding between these two profiles generates the opening of the jaws, while the closing thereof around the gripped semi-finished product occurs due to said elastic return means.

The jaws in clamps for opening on command instead are opened by a cam gear which transfers the opening movement to the jaws.

The handling devices for containers of the known art still have drawbacks. Since the opening and closing of the jaws occurs by interference in the handling devices provided with clamps for no command opening, it is essential for the jaws to be pushed (and therefore pressed) against the profile of the container to be gripped, which may cause an undesired movement of the container and therefore a malfunctioning of the handling device.

With regards to the handling devices provided with clamps for opening on command of the known art, they provide a gear for opening the jaws which, given the speed with which the container is handled, is to be highly calibrated, and therefore is characterized by significant costs and complexities.

SUMMARY OF THE INVENTION

It is the object of the present invention to provide a handling device for containers provided with clamps for opening on command, having features such as to resolve at least some of the drawbacks of the known art.

It is a particular object of the present invention to provide a handling device provided with automatic clamps, which is less costly and complex with respect to the known art.

According to one aspect of the invention, a handling device for containers comprises:
- a support element;
- a support plate, fixed to the support element;
- a drive shaft;
- a rotation plate, hinged to the drive shaft;
- one or more clamps, connected to the rotation plate, comprising:
  - a first jaw, comprising a handling portion and a drive portion;
  - a conduction wheel, connected to the drive portion of the first jaw;
  - a second jaw, comprising a handling portion and a drive portion, in which the drive portion of the second jaw is connected to the drive portion of the first jaw;
  - an elastic return element;

characterized in that:
- at least one cam profile is fixed in correspondence with a peripheral area of the support plate for opening on command, configured so that the first jaw opens when the conduction wheel rotates on the cam profile;
- a slot is obtained on the drive portion of the second jaw, in which said slot comprises a pressure surface;
- a wheel is mounted onto the drive portion of the first jaw and inserted inside the slot formed on the drive portion of the second jaw;
- the opening of the second jaw is coupled to the opening of the first jaw by the wheel, in which said wheel is configured in order to act on the pressure surface of the slot.

The handling device thus configured allows an easy handling of a container to be transferred from one work station to another, therefore avoiding any malfunctions that may be generated by clamps for no command opening.

Moreover, the handling device of the invention does not have complex and costly gears for the automatic opening and closing of the jaws, therefore being a less complex and less costly device.

BRIEF DESCRIPTION OF THE DRAWINGS

To better understand the invention and appreciate its advantages, certain non-limiting embodiments thereof are described below, while referring to the drawings, in which.

DETAILED DESCRIPTION OF THE PREFERRED EMBODIMENT

Figure 1:
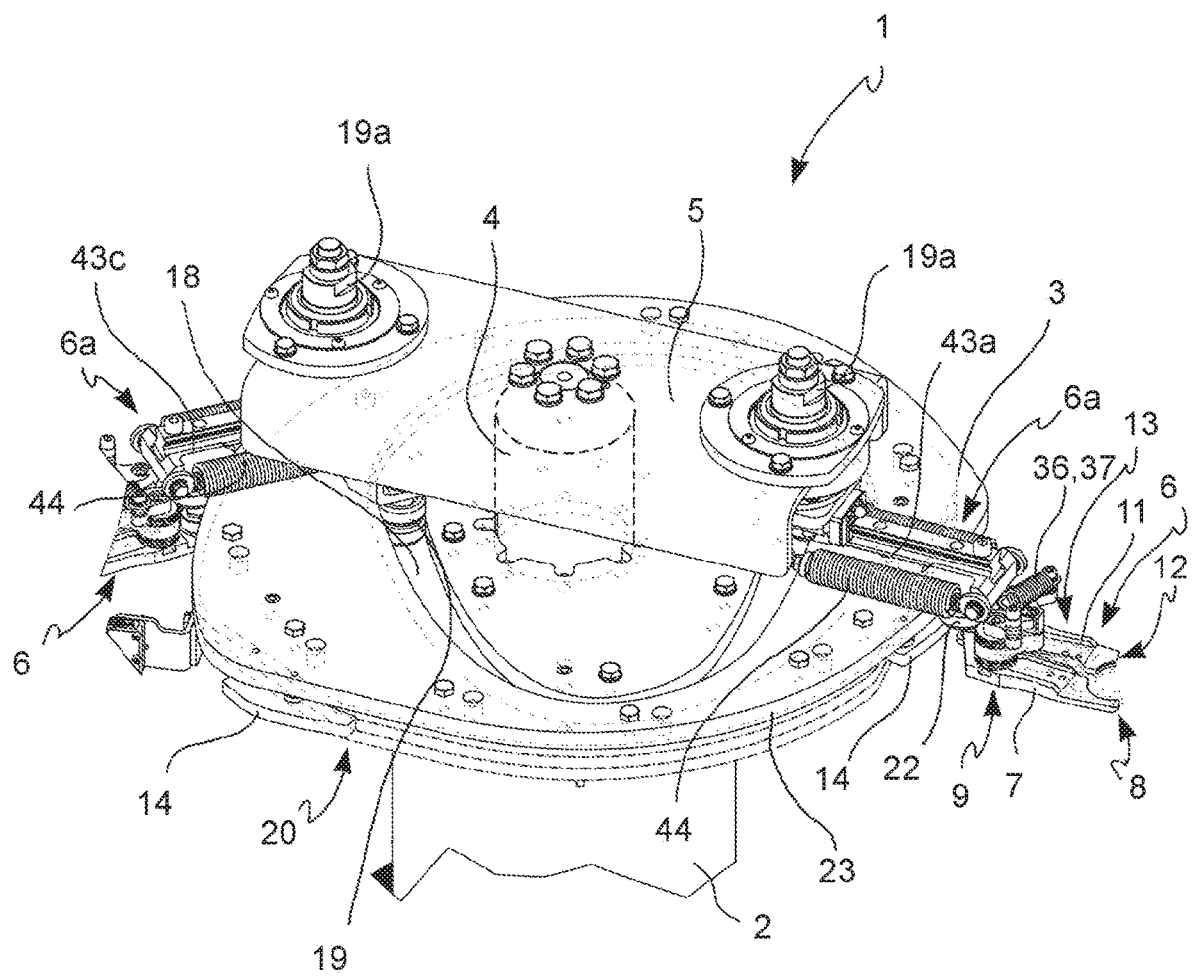
FIG. 1 is a perspective view of the handling device for containers of the invention, according to one embodiment of the invention.

With reference to the drawings, the handling device according to the invention is generally indicated with numeral 1.

According to one aspect of the invention, the handling device 1 comprises:
- a support element 2;
- a support plate 3, fixed to the support element 2;
- a drive shaft 4;
- a rotation plate 5, hinged to the drive shaft 4;
- one or more clamps 6, connected to the rotation plate 5, comprising:
  - a first jaw 7, comprising a handling portion 8 and a drive portion 9;
  - a conduction wheel 10, connected to the drive portion 9 of the first jaw 7;
  - a second jaw 11, comprising a handling portion 12 and a drive portion 13, in which the drive portion 13 of the second jaw 11 is connected to the drive portion 9 of the first jaw 7;
  - an elastic return element 37;
- in which:
  - at least one cam profile 14 is fixed in correspondence with a peripheral area 20 of the support plate 3 for opening on command, configured so that the first jaw 7 opens when the conduction wheel 10 rotates on the cam profile 14;
  - a slot 15 is obtained on the drive portion 13 of the second jaw 11, in which said slot 15 comprises a pressure surface 16,
  - a wheel 17 is mounted onto the drive portion 9 of the first jaw 7 and inserted inside slot 15 formed on the drive portion 13 of the second jaw 11;
  - the opening of the second jaw 11 is coupled to the opening of the first jaw 7 by wheel 17, in which said wheel 17 is configured to act on the pressure surface 16 of slot 15.

The handling device 1 thus configured allows an easy handling of a container to be transferred from one work station to another, therefore avoiding any malfunctions that may be generated by clamps for no command opening.

Moreover, the handling device 1 of the invention does not have complex and costly gears for the automatic opening and closing of the jaws, therefore being a less complex and less costly device.

Description of the Assembly of the Components Comprised in the Handling Device 1

Two clamp assemblies 6a in substantially opposite positions are pivotally connected on the rotation plate 5 by respective hinges 19a. The clamp assemblies 6a could be more than two in various embodiments, e.g. three or four.

A cam path 18 is formed on the support plate 3 of the handling device 1, inside which path is a dual sliding conduction wheel 19, which is connected to the clamp assembly by a lever mechanism (not shown), which allows the rotation of the clamp assembly 6a around the axis of hinge 19a.

Thereby, the clamp assemblies 6a, therefore the clamps 6, may rotate in direction of the containers to be picked from the work station or in direction of the release point of a container so as to optimize the related positioning between the clamps 6 and the release or gripping, and therefore facilitate the handling.

One or more cam profiles 14 are fixed in correspondence with a peripheral area 20 of the support plate 3 in predetermined positions corresponding to the positions taken on by the clamps 6 when the containers are gripped or released.

According to one embodiment of the invention (FIGS. 2 to 3), the clamps 6 are connected to the rotation plate 5 by a support element 21. The support element 21 is connected with a slide 43, preferably by a prismatic coupling, and said slide 43 is configured so as to translate away from the drive shaft 4 along a track 43a. A primary conduction wheel 22 is hinged to said slide 43, the primary conduction wheel being configured to rotate around its own rotation axis 24 and so as to rotate on an outer track 23 (FIG. 1) formed on the peripheral area 20 of the support plate 3. Thereby, slide 43 makes the clamps 6 advance in direction of the containers to be picked from the work station or in direction of the release point of a container.

Then a plurality of springs 44 returns slide 43 to a resting position.

Figure 2:
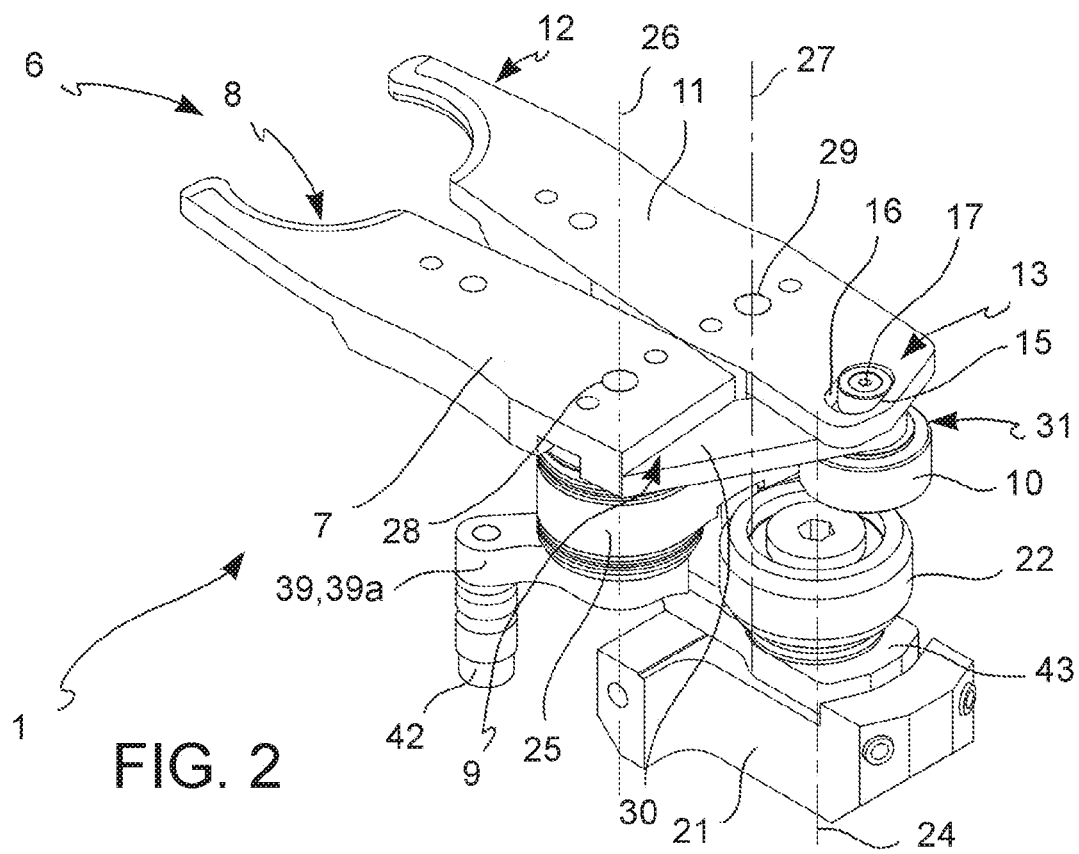
FIG. 2 is a bottom perspective view of a clamp of the handling device of the invention, according to one embodiment of the invention.
Figure 3:
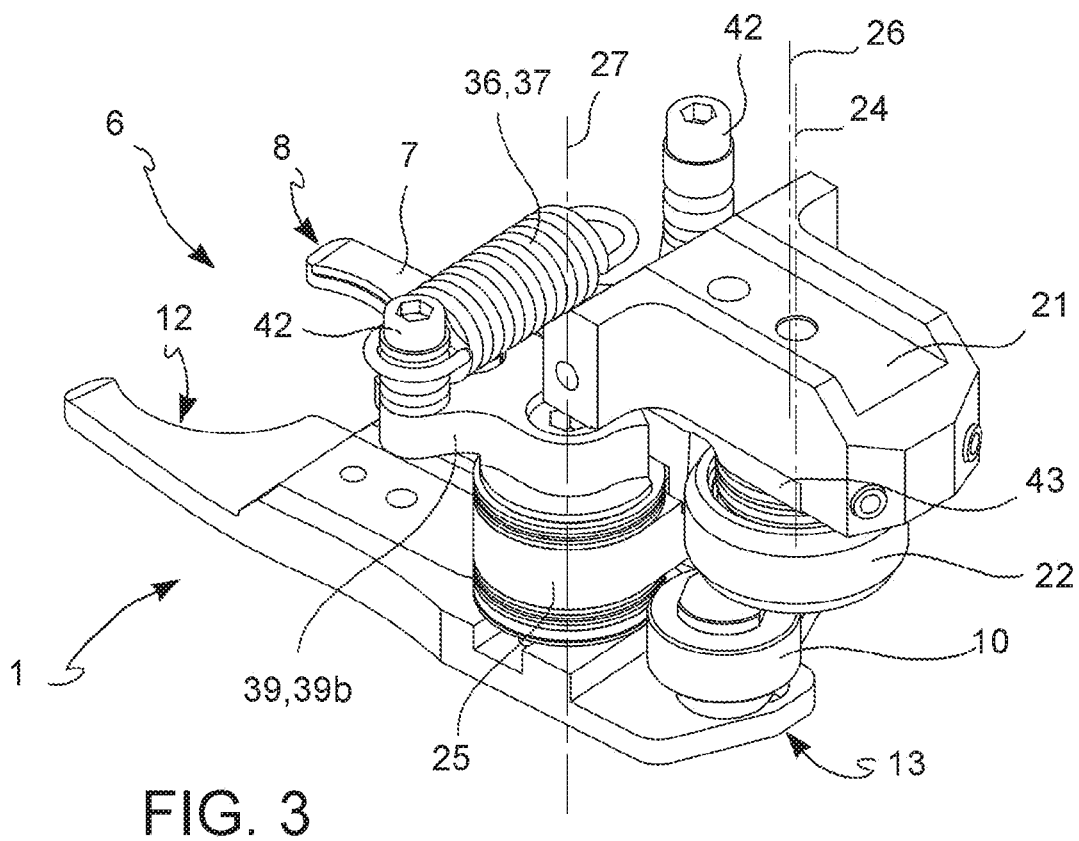
FIG. 3 is a top perspective view of the clamp in FIG. 2.

On the support element 21 a support block 25 is connected, to which the two jaws 7, 11 are hinged, so that the jaws 7, 11 can rotate around a first rotation axis 26 (for the first jaw 7), and a second rotation axis (for the second jaw 11), respectively (FIGS. 2 to 3).

In particular, the rotation axes 26, 27 of the jaws 7, 11 pass through a first fulcrum 28 (for the first jaw 7) and through a second fulcrum 29 (for the second jaw 11), respectively.

The jaws 7, 11 further comprise connection portions 39, one connection portion 39a for the first jaw 7 and one connection portion 39b for the second jaw 11, respectively. The connection portions 39a and 39b are hinged to the support block 25 in correspondence with the rotation axes 26, 27, respectively, in order to rotate together with the jaws 7, 11.

According to a preferred embodiment, the connection portions 39 are comprised between the support element 21 and the support block 25.

A pin 42 is fixed on both the connection portions 39, to which pin the elastic element 37 is connected, for example the return spring 36 (FIGS. 1, 3, 6, 7 depict the return spring 36 connected to one pin 42 alone).

An appendix 30 extends from the first jaw 7 in correspondence with the drive portion (9) of the first jaw (7), which connects the first jaw (7) to the second jaw (11).

In particular, the conduction wheel 10 and wheel 17 are hinged in correspondence with an end 31 of appendix 30. Said wheel 17 is also inserted inside slot 15 formed on the drive portion 13 of the second jaw 11.

Description of the Jaws 7, 11 Opening

Figure 4:
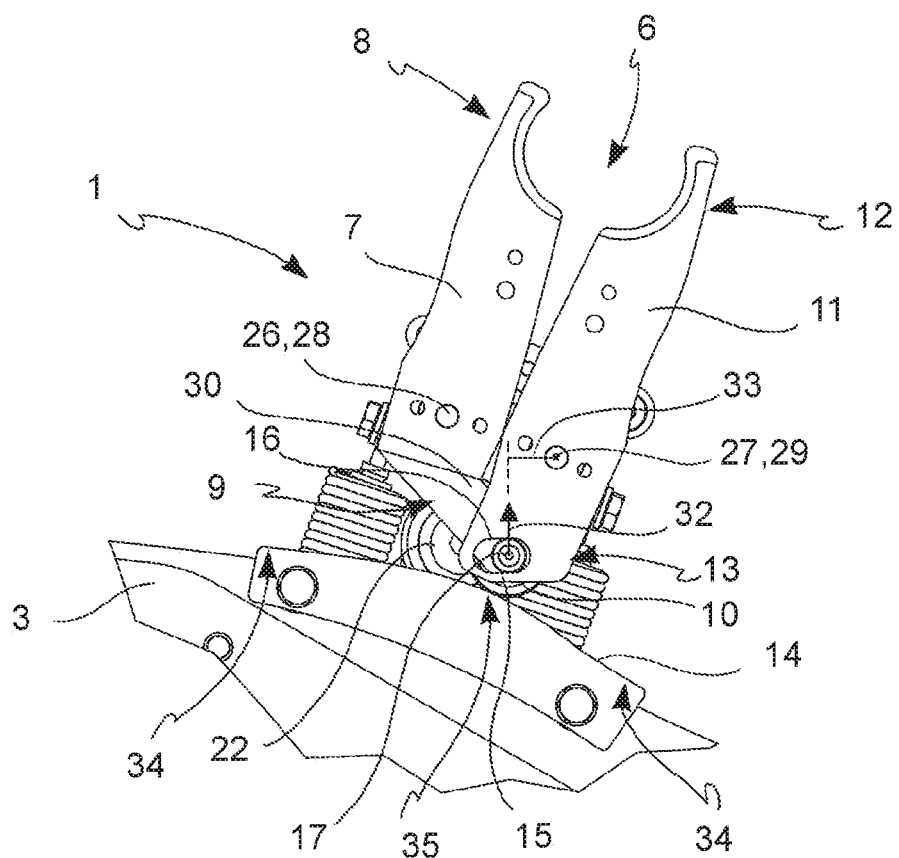
FIG. 4 is a bottom view of the clamp in FIG. 2, during a step of opening the jaws.
Figure 7:
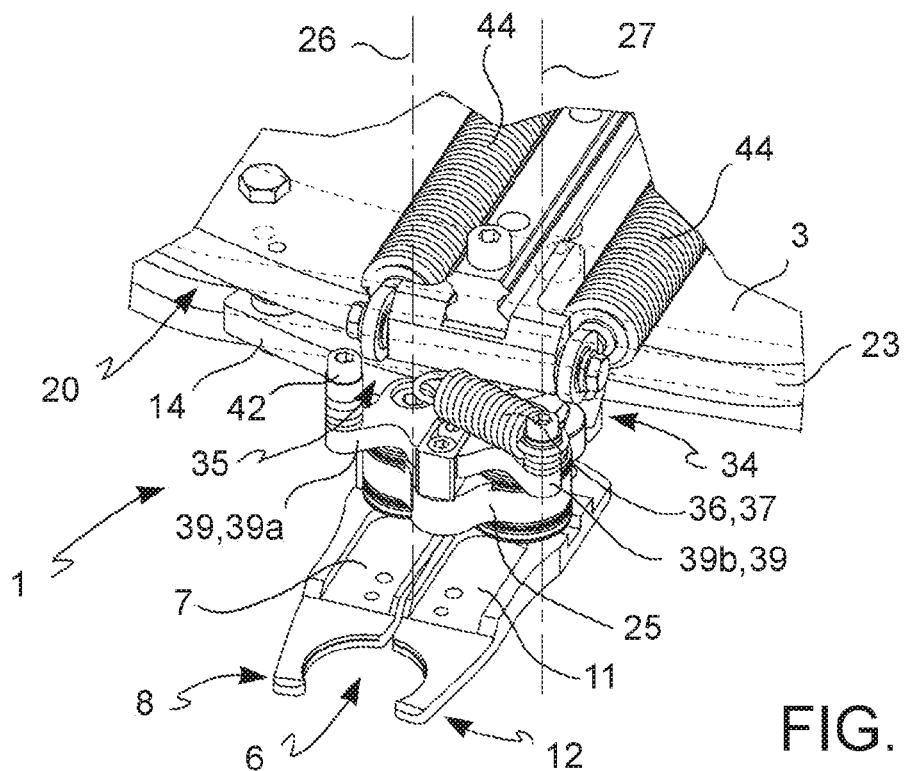
FIG. 7 is a top perspective view of the clamp in FIG. 2, during a step of closing the jaws.
Figure 8:
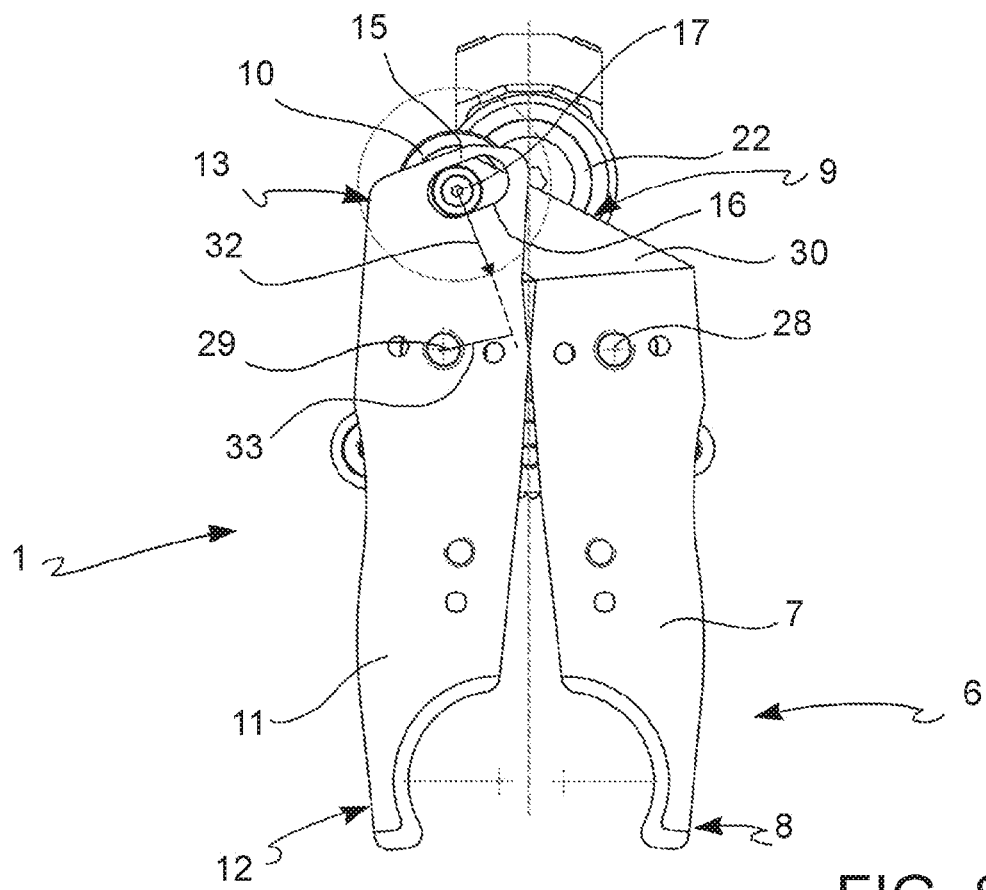
FIG. 8 is a simplified bottom view of the clamp in FIG. 2, during a step of opening the jaws.
Figure 9:
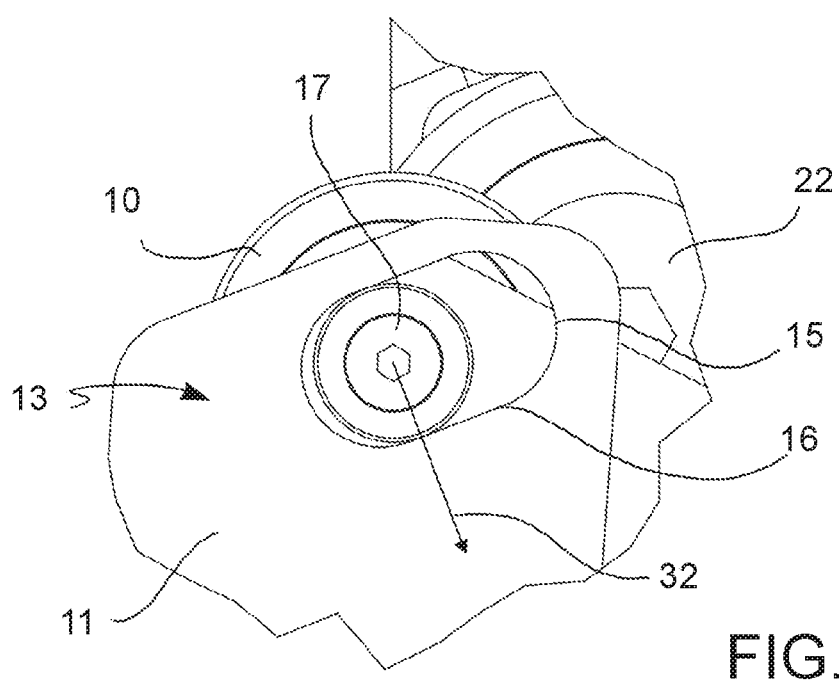
FIG. 9 is a bottom view of a detail of the clamp in FIG. 8.

According to one aspect of the invention, the cam profile 14 is configured so as to make the conduction wheel 10 and the first jaw 7 connected thereto, rotate around the first rotation axis 26, determining the opening of the first jaw 7 and the traction of the elastic return element 37 (FIGS. 4 and 7).

During the opening of the jaws 7, 11, the cam profile 14 is configured in order to make the conduction wheel 10 rotate from a closing area 34 to an opening area 35 of the cam profile 14.

Wheel 17 mounted on the drive portion 9 of the first jaw 7 and inserted inside slot 15 is configured so that when the first jaw 7 and wheel 17 rotate around the first rotation axis 26, said wheel 17 applies a force 32 on the pressure surface 16 of slot 15.

The force 32, being directed perpendicularly to the pressure surface 16, realizes an arm 33 by which it applies a rotation to the second jaw 11 around the second rotation axis 27, determining the opening of the second jaw 11 (FIG. 4).

Advantageously, the shape of slot 15 is configured to allow wheel 17 to apply force 32 which determines the opening of the second jaw 11, during the whole rotating movement of wheel 17 with respect to its own first rotation axis 26. Moreover, the shape of slot 15 also ensures the momentum actuated by force 32 imparted by wheel 17 is positive (with reference to the rotation direction of the opening of the second jaw 11) during the whole rotating movement of wheel 17 with respect to its own first rotation axis 26. These advantages make the handling device 1 of the present invention highly effective.

Description of the Jaws 7, 11 Closing

The cam profile 14 is also configured so as to make the conduction wheel 10 and the first jaw 7 connected thereto, rotate around the first rotation axis 26, determining the closing of the first jaw 7.

Figure 5:
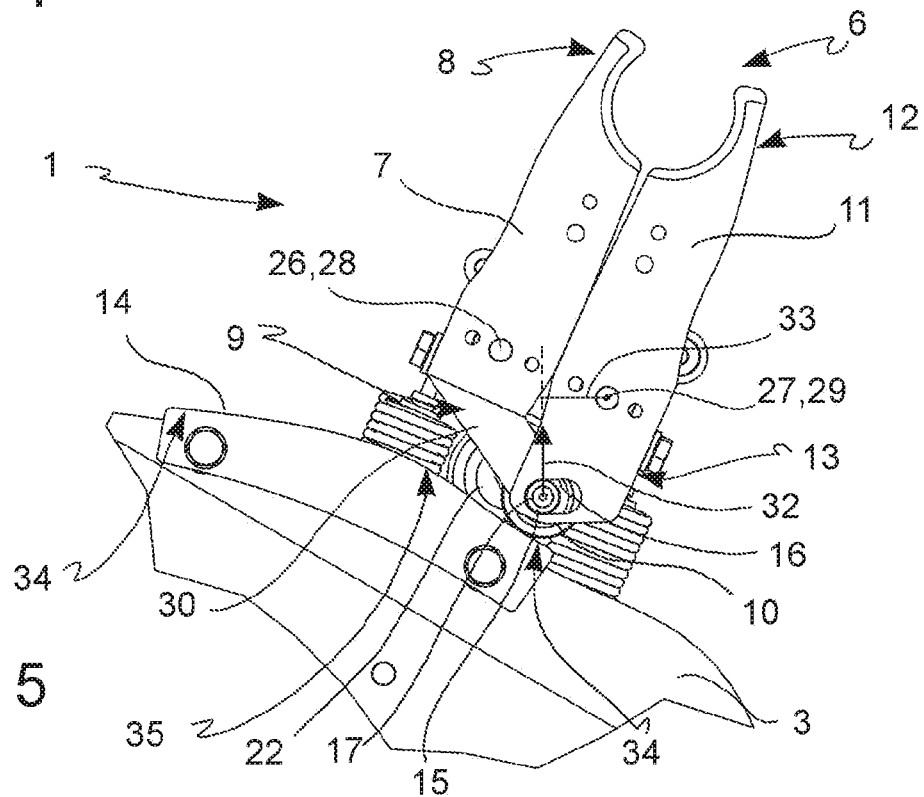
FIG. 5 is a bottom view of the clamp in FIG. 2, during a step of closing the jaws.
Figure 6:
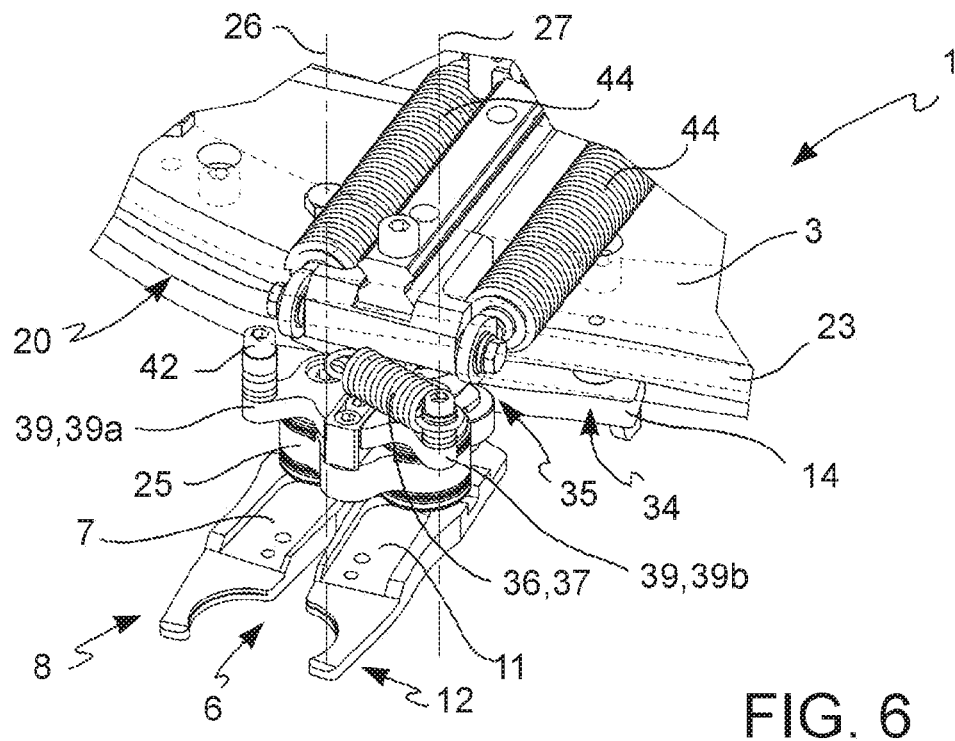
FIG. 6 is a top perspective view of the clamp in FIG. 2, during a step of opening the jaws.

During the closing of the jaws 7, 11, the cam profile 14 is configured in order to make the conduction wheel 10 rotate from the opening area 35 to a closing area 34 of the cam profile 14 (FIG. 5).

The return spring 36 connecting the two pins 42 connected to the jaws 7, 11 is configured so as to elastically recall the clamps in a resting position, thus determining the closing of the second jaw 11 (FIG. 7).

A person skilled in the art, with the object of meeting contingent and specific needs, can make further changes and variants, moreover all contained within the scope of protection defined by the claims.

The invention claimed is:

1. A handling device for containers, comprising:
   a support element;
   a support plate fixed to the support element;
   a drive shaft;
   a rotation plate connected to the drive shaft by a hinge;
   one or more clamps connected to the rotation plate, comprising:
      a first jaw comprising a handling portion and a drive portion;
      a conduction wheel connected to the drive portion of the first jaw;
      a second jaw comprising a handling portion and a drive portion, wherein the drive portion of the second jaw is connected to the drive portion of the first jaw;
      an elastic return element;
      at least one cam profile fixed in correspondence with a peripheral area of the support plate for opening on command, configured so that the first jaw opens when the conduction wheel rotates on the cam profile;
      a slot on the drive portion of the second jaw, wherein said slot comprises a pressure surface;
      a wheel mounted onto the drive portion of the first jaw and inserted inside the slot formed on the drive portion of the second jaw;
      wherein opening of the second jaw is coupled to opening of the first jaw by the wheel, wherein said wheel is configured to act on the pressure surface of the slot;
      a cam path formed on the support plate;
      a sliding conduction member inside the cam path on the support plate, connected to a clamp assembly by a lever mechanism, which allows rotation of the clamp assembly around an axis of the hinge.

2. The handling device according to claim 1, wherein an appendage extends from the first jaw, the appendage connecting the first jaw to the second jaw, in correspondence with one end of the appendage, the conduction wheel and the wheel being hinged, wherein said wheel is inserted inside the slot formed on the drive portion of the second jaw.

3. The handling device according to claim 1, wherein the cam profile is configured to make the conduction wheel rotate from a closing area to an opening area of the cam profile, and vice versa, during opening of the jaws and during the closing of the jaws.

4. A handling device for containers, comprising:
   a first support element;
   a support plate fixed to the first support element;
   a drive shaft,
   a rotation plate hinged to the drive shaft;
   one or more clamps connected to the rotation plate, comprising:
      a first jaw comprising a handling portion and a drive portion;
      a conduction wheel connected to the drive portion of the first jaw;
      a second jaw comprising a handling portion and a drive portion, wherein the drive portion of the second jaw is connected to the drive portion of the first jaw;
      an elastic return element;
      at least one cam profile fixed in correspondence with a peripheral area of the support plate for opening on command, configured so that the first jaw opens when the conduction wheel rotates on the cam profile;
      a slot on the drive portion of the second jaw, wherein said slot comprises a pressure surface;
      a wheel mounted onto the drive portion of the first jaw and inserted inside the slot formed on the drive portion of the second jaw;
      wherein opening of the second jaw is coupled to opening of the first jaw by the wheel, wherein said wheel is configured to act on the pressure surface of the slot;
      wherein the one or more clamps are connected to the rotation plate by a second support element, wherein the second support element is connected to a slide, and said slide is configured to translate away from the drive shaft, wherein a primary conduction wheel is hinged to said slide, the primary conduction wheel being configured to rotate around a primary conduction wheel rotation axis and to rotate on an outer track formed on the peripheral area of the support plate.

5. The handling device according to claim 4, wherein, on the second support element a support block is connected, to which the first and second jaws are hinged, wherein the jaws rotate around a first rotation axis for the first jaw, and a second rotation axis for the second jaw.

6. The handling device according to claim 5, wherein the jaws comprise connection portions, one connection portion for the first jaw, and one connection portion for the second jaw; and said connection portions are hinged to the support block in correspondence with the rotation axes, to rotate together with the jaws, a pin being fixed on both of the connection portions, the elastic element being connected to the pin.

7. The handling device according to claim 5, wherein the wheel mounted on the drive portion of the first jaw and inserted inside the slot is configured so that, when the first jaw and the wheel rotate around the first rotation axis, said wheel applies a force on the pressure surface of the slot.

8. The handling device according to claim 7, wherein the force, being directed perpendicularly to the pressure surface, through an arm to apply a rotation to the second jaw around the second rotation axis, determining opening of the second jaw.

9. The handling device according to claim 7, wherein the shape of the slot is configured to allow the wheel to apply the force which determines opening of the second jaw, during the whole rotating movement of the wheel with respect to the primary conduction wheel rotation axis, and ensure that momentum implemented by the force applied by the wheel is positive, with reference to the direction of rotation of the opening of the second jaw, during the whole rotating movement of the wheel with respect to the primary conduction wheel rotation axis.

\* \* \* \* \*